United States Patent [19]

Peters et al.

[11] Patent Number: 4,923,691

[45] Date of Patent: May 8, 1990

[54] ALUMINUM NITRIDE POWDER AND A PROCESS FOR THE PREPARATION THEREOF

[75] Inventors: Dieter Peters, Hürth; Gero Heymer; Christian May, both of Erftstadt, all of Fed. Rep. of Germany

[73] Assignee: Hoechst Aktiengesellschaft, Frankfurt am Main, Fed. Rep. of Germany

[21] Appl. No.: 364,013

[22] Filed: Jun. 9, 1989

[30] Foreign Application Priority Data

Jun. 23, 1988 [DE] Fed. Rep. of Germany ....... 3821185
Jan. 3, 1989 [DE] Fed. Rep. of Germany ....... 3900065

[51] Int. Cl.$^5$ ............................................. C01B 21/072
[52] U.S. Cl. ................................................. 423/412
[58] Field of Search ............................................. 423/412

[56] References Cited

U.S. PATENT DOCUMENTS

| 4,610,857 | 9/1986 | Ogawa et al. | 423/412 |
| 4,612,045 | 9/1986 | Shintaku | 423/412 |
| 4,680,278 | 7/1987 | Inoue et al. | 423/412 |

FOREIGN PATENT DOCUMENTS

| 126697 | 10/1979 | Japan | 423/412 |
| 6104 | 1/1986 | Japan | 423/412 |
| 91008 | 5/1986 | Japan | 423/412 |
| 55108 | 3/1988 | Japan | 423/412 |

OTHER PUBLICATIONS

F. F. Grekov et al., J. Applied Chemistry(Moscow) 2:249-254 (1988).

*Primary Examiner*—John Doll
*Assistant Examiner*—Wayne A. Langel

[57] ABSTRACT

An aluminum nitride powder has a crystallite size of 40 to 150 nm, measured by powder diffractometry and evaluated by the method of Scherrer, a primary particle size of 0.1 to 0.5 $\mu$ m, a specific surface according to BET of 5 to 50 m$^2$/g and a degree of whiteness of more than 91%, measured using light of a 400 to 700 nm wavelength against barium sulfate analytical reagent as standard of whitness.

To prepare this aluminum nitride powder, metallic aluminum and monoamminealuminum chloride [AlCl$_3$(NH$_3$)] are first molten together in an inert gas atmosphere at temperatures above 125° C. and allowed to react with one another with evolution of hydrogen. 8 to 20 g of ammonia are then introduced per hour per mol of monoamminealuminum chloride into the aluminum-containing monoamminealuminum chloride melt at temperatures between 250° and 400° C., aluminum nitride being precipitated as a solid until the conversion of the aluminum is complete. The temperature of the melt is finally raised to more than 400° C.

21 Claims, No Drawings

ALUMINUM NITRIDE POWDER AND A PROCESS FOR THE PREPARATION THEREOF

The present invention relates to aluminum nitride powder and to a process for the preparation thereof which comprises melting metallic aluminum and monoamminealuminum chloride [AlCL$_3$(NH$_3$)] together in an inert gas atmosphere at temperatures above 125° C. and allowing these to react with one another with evolution of hydrogen.

Aluminum nitride powders are of interest for the manufacture of ceramic components for use in electronics, since aluminum nitride is a very good heat conductor and at the same time a good electrical insulator.

Aluminum nitride powders are generally manufactured in industry by direct nitriding of aluminum, the disadvantage being that these processes are based on a reaction between a solid and a gaseous phase and are associated with high grinding costs and a relatively low degree of nitriding of the aluminum.

Furthermore, the reaction of monoamminealuminum chloride and metallic aluminum in an argon or ammonia atmosphere in a molar ratio of aluminum to monoamminealuminum chloride of 0.25 to 3.0 at temperatures between 27 and 427° C. with evolution of hydrogen is known. The aluminum imidochloride formed in the reaction is converted to aluminum nitride at temperatures around 1100° C. (cf. Journal for Applied Chemistry (Moscow), No. 2, 1988, pp. 249 to 254). In this process the long reaction times are a disadvantage.

It is thus the object of the present invention to make available an aluminum nitride powder which is especially suitable for the manufacture of ceramic parts for use in electronics, and a process for the preparation thereof which starts from metallic aluminum and provides a high degree of nitriding and in which the metallic aluminum and monoamminealuminum chloride are molten together in an inert gas atmosphere at temperatures above 125° C. In this process the aluminum nitride according to the invention is characterized by a crystallite size of 40 to 150 nm, preferably 70 to 120 nm measured by powder diffractometry and evaluated by the method of Scherrer, by a primary particle size of 0.1 to 0.5 μm, by a specific surface according to BET of 5 to 50 m$^2$/g and by a degree of whiteness of more than 91%, measured using light of a 400 to 700 nm wavelength against barium sulfate analytical reagent as standard of whiteness, while in the process according to the invention 8 to 20 g, preferably 12 to 15 g of ammonia are introduced per hour per mol of monoamminealuminum chloride into the aluminun-containing monoamminealuminum chloride melt at temperatures between 250° and 400° C., preferably between 280° and 360° C., aluminum nitride being precipitated as a solid until the conversion of the aluminum is complete, the temperature of the melt being finally raised to more than 400° C., preferably to 420°–600° C.

The process according to the invention may be further selectively carried out in that (a) the amount of metallic aluminum added to the monoamminealuminum chloride melt is such that the molar ratio of aluminum to monoamminealuminum chloride is 0.5 to 1.2, preferably 0.9 to 1.1, and in that passage of ammonia into the melt containing solid metallic aluminum is maintained until all of the metallic aluminum added to the melt is taken up by the melt with simultaneous precipitation of aluminum nitride and has reacted with the ammonia forming aluminum nitride;

(b) 30 to 70 mol % of the monoamminealuminum chloride in the reaction system is replaced by aluminum chloride or ammonium chloride or mixtures thereof while maintaining a molar ratio of total aluminum to total monoamminealuminum chloride of (0.5 to 1.2):1;

(c) only so much ammonia is added per unit of time that the ammonia concentration in the evolving hydrogen is less than 0.3% and the excess of ammonia in the melt after all of the aluminum has reacted is not more than 0.5, preferably less than 0.2 mol of ammonia per mol of monoamminealuminum chloride;

(d) so much ammonia is introduced into the monoamminealuminum chloride melt after all of the aluminum has reacted that 1 to 3, preferably 1.5 to 2.5 mol of ammonia are taken up per mol of the monoamminealuminum chloride used, before the temperature is raised above 400° C.;

(e) the aluminum is used in the form of rods, blocks or shot;

(f) the precipitated aluminum nitride is separated from the monoamminechloride melt by filtration;

(g) the molten monoamminealuminum chloride is distilled off from the precipitated aluminum nitride;

(h) the removal by distillation of the monoamminealuminum chloride is carried out in vacuo or in an inert gas atmosphere with the formation of aluminum nitride agglomerates having d$_{50}$>10 μm;

(i) the removal by distillation of the monoamminealuminum chloride is carried out in an ammonia atmosphere with the formation of aluminum nitride agglomerates having d$_{50}$<10 μm, preferably 5 μm;

(j) the separated aluminum nitride is annealed at temperatures between 400° and 1500° C.;

(k) the annealing is carried out in an inert gas or ammonia atmosphere or mixtures thereof.

The aluminum nitride powder according to the invention has a higher degree of whiteness, a higher degree of nitriding, a higher specific surface, smaller crystallite sizes and smaller primary particle sizes than commercially available aluminum nitride powders.

For the process according to the invention it is recommended to use nitrogen, hydrogen, noble gases or mixtures thereof as the inert gas, while quantitative yields are achieved at uniform rates of reaction when aluminum is used in the form of rods, blocks or shot.

If in the process according to the invention the monoamminealuminum chloride is removed by distillation in vacuo or in an inert gas atmosphere, large aluminum nitride agglomerates (d$_{50}$>10 μm) are obtained; however, if the monoamminealuminum chloride is removed in an ammonia atmosphere (>0.5 mol of ammonia per mol of monoamminealuminum chloride), small, readily disintegratable aluminum nitride agglomerates (d$_{50}$<5 μm) are obtained.

In the process according to the invention the viscosity of the aluminum-containing monoamminealuminum chloride melt in which aluminum nitride is suspended can be kept low by choosing an application ratio of aluminum to monoamminealuminum chloride of 0.5 to 1.2 in the reaction system and by the amount of ammonia introduced being up to 20 g per hour and mol of monoamminealuminum chloride, and the excess ammonia being less than 0.5 mol per mol of monoamminealuminum chloride.

The table below compares three aluminum nitride powders with each other, the powder A being the aluminum nitride according to the invention and the powders B and C being commercially available aluminum nitrides (B is prepared by a process of carbothermic nitriding; C is prepared by a process of direct nitriding). The specific surface in the table and in Examples 1 to 8 was determined by the BET method (cf. Brunauer, Emmet and Teller in J. Amer. Chem. Soc., vol. 60, 1938, p. 309), while the crystallite size was measured on flat preparations with the aid of the PHILIPS powder diffractometer APD 1700 (with graphite monochromator; Cu$_{K\alpha}$ radiation) using the 100, 002 and 101 reflections and evaluated by the method of SCHERRER according to the equation $$D = \frac{5.73 \times \lambda}{\cos\theta \times \sqrt{B^2 - B^2}}$$

(D=crystallite size in nm; $\lambda$=1.541778 A; $\theta$=angle of diffraction; B=measured width of reflection; $B_o$=instrument constant=0.075°). Finally, the determination of the degree of whiteness was carried out with the aid of the ZEISS colorimeter RFC 3 at wavelengths between 400 and 700 nm using barium sulfate analytical reagent as whiteness standard.

|  | A | B | C |
|---|---|---|---|
| Nitrogen % by Wt. | 34.1 | 33.3 | 33.6 |
| Spec. surface [m²g⁻¹] | 15 | 4 | 4 |
| Size of Crystallites [nm] | | | |
| 100 | 92 | 158 | 114 |
| 002 | 90 | 159 | 126 |
| 101 | 38 | 150 | 111 |
| Particle diameter according REM (μm) | ~0.2 | ~1 | ~2 |
| Degree of whiteness at | | | |
| 400 nm | 92.3 | 85.5 | 57.9 |
| 500 nm | 95.8 | 87.7 | 55.7 |
| 600 nm | 98.3 | 88.8 | 88.8 |
| 700 nm | 98.8 | 89.8 | 89.8 |

EXAMPLE 1

In a rotary container closed on one side 5 g of aluminum shot (Al>99.99%) and 100 g of monoamminealuminum chloride (prepared according to G. Brauer: in "Handbuch der präparativen anorganischen Chemie", ["Handbook of Preparative Inorganic Chemistry"], vol. 2, 1978, p. 829) was heated at 300° C. for 1 hour in an inert gas atmosphere. The melt was filtered off from the shot residue and the shot was back-weighed. The loss of mass of the shot was 1.9 g, the melt took up 10 mol % of aluminum, based on the monoamminealuminum chloride used. A white solid was precipitated from the melt with gaseous ammonia and the monoamminealuminum chloride was distilled off at 420° C. The residue was annealed in a stream of ammonia at 1500° C.

Yield (based on metallic aluminum): 99%.
Analysis: Al 65.8% (theory for AlN: 65.9%), N 34.1% (theory for AlN: 34.1%), Cl 0.03%.
Specific surface: 15 m²g⁻¹.

EXAMPLE 2

In a rotary container closed on one side 27 g of aluminum shot (Al>99.99%) and 150 g of monoamminealuminum chloride was heated in a nitrogen atmosphere at 300° C.; when the reaction temperature was reached, 15 g of ammonia per hour was introduced per mol of monoamminealuminum chloride. A white solid precipitated from the melt, while the reaction of the aluminum shot proceeded with time. The temperature was raised to 420° C. and the monoamminealuminum chloride was distilled off. The residue consisted of a white loose powder (aluminum nitride by X-ray) which was annealed at 1500° C. in a stream of ammonia.

Yield (based on metallic aluminum): 98%.
Analysis: Al 65.8% (theory for AlN: 65.9%), N 34.0% (theory for AlN: 34.1%), Cl 0.03%.
Specific surface: 14 m²g⁻¹.
Degree of whiteness (average): 96% (400 to 700 nm).

EXAMPLE 3

In a rotary container closed on one side 15 g of aluminum shot (Al>99.99%) and 150 g of monoamminealuminum chloride was heated at 320° C. in an inert gas atmosphere. A white solid was precipitated from the melt being formed with ammonia. The monoamminealuminum chloride was distilled off at 420° C. The residual loose white powder was annealed at 1300° C. in a stream of ammonia-nitrogen (1:1). X-ray photographs of the powder from 420° C. indicated that it was aluminum nitride.

Yield (based on metallic aluminum): 99%.
Analysis: Al 65.7% (theory for AlN: 65.9%), N 33.8% (theory for AlN: 34.1%), Cl 0.5%.
Specific surface: 45 m²g⁻¹.
Crystallite size: (100) 56 nm, (002) 63 nm, (101) 56 nm.

EXAMPLE 4

In a stirred container 27 g of aluminum filings (Al>99.99%) and 150 g of monoamminealuminum chloride were heated at 280° C. in an inert gas atmosphere. A white solid was precipitated from the melt by the addition of ammonia. Vacuum was created with the aid of an oil pump and the monoamminealuminum chloride was distilled off. The residual white powder was annealed at 1500° C. in a stream of ammonia.

Yield (based on metallic aluminum): 60%.
Analysis: Al 65.8% (theory for AlN: 65.9%), N 34.1% (theory for AlN: 34.1%), Cl 0.04%.
Specific surface: 12 m²g⁻¹.
Crystallite size: (100) 92 nm, (002) 90 nm, (101) 88 nm.

EXAMPLE 5

Example 4 was repeated except that aluminum powder with a particle size of about 165 μm was used instead of the aluminum filings.

Yield (based on metallic aluminum): 80%.

EXAMPLE 6

Example 2 was repeated except that 7 g of ammonia was introduced per hour per mol of monoamminealuminum chloride.

This caused the rate of reaction to slow down and the yield was only 70%.

EXAMPLE 7

Example 2 was repeated except that 30 g of ammonia was introduced per hour per mol of monoamminealuminum chloride.

At the start of the reaction the rate of reaction was comparable to that in Example 2, but the yield was only 55%.

EXAMPLE 8

In a rotary container closed on one side 27 g of aluminum shot (Al>99.99%) and 150 g of monoamminealuminum chloride was heated at 330° C. in a nitrogen atmosphere. After the reaction temperature was reached and the melt had formed, 15 g of ammonia was introduced per hour per mol of monoamminealuminum chloride, whereupon aluminum nitride precipitated from the melt, while the reaction of the aluminum shot proceeded with time. When the aluminum nitride had separated out, such an amount of ammonia was introduced into the melt that 2.2 mol of ammonia were taken up per mol of monoamminealuminum chloride. The melt was then heated at 420° C. in a stream of ammonia and concentrated. The residue was annealed in a stream of ammonia at 1300° C.

Agglomerates having $d_{50} \sim 2.5$ μm with primary particle sizes of $d_{50} \sim 0.2$ μm were obtained.

EXAMPLE 9

Example 8 was repeated except that after the aluminum nitride had seprated off so much ammonia was introduced into the melt that 0.5 mol of ammonia was taken up per mol of monoamminealuminum chloride. After heating the melt in a stream of ammonia at 420° C. it was concentrated. The residue was annealed at 1300° C. in a stream of ammonia. Agglomerates having $d_{50} \sim 35$ μm were obtained.

We claim:

1. A process for the preparation of aluminum nitride powder, which comprises melting metallic aluminum and monoamminealuminum chloride [$AlCl_3(NH_3)$] together in an inert gas atmosphere at temperatures above 125° C. and allowing these to react with one another with evolution of hydrogen; 8 to 20 g of ammonia are introduced per hour per mol of monoamminealuminum chloride into the aluminum-containing monoamminealuminum chloride melt at temperatures between 250° and 400° C., aluminum nitride being precipitated as a solid until the conversion of the aluminum is complete, the temperature of the melt being finally raised to more then 400° C.

2. The process as claimed in claim 1, wherein the amount of metallic aluminum added to the monoamminealuminum chloride melt is such that the molar ratio of aluminum to monoamminealuminum chloride is 0.5 to 1.2, and in that passage of ammonia into the melt containing solid metallic aluminum is maintained until all of the metallic aluminum added to the melt is taken up by the melt with simultaneous precipitation of aluminum nitride and has reacted with the ammonia forming aluminum nitride.

3. The process as claimed in claim 2, wherein the amount of metallic aluminum added to the monoamminealuminum chloride melt is such that the molar ratio of aluminum to monoamminealuminum chloride is 0.9 to 1.1.

4. The process as claimed in claim 2, wherein 30 to 70 mol % of the monoamminealuminum chloride in the reaction system is replaced by aluminum chloride or ammonium chloride or mixtures thereof while maintaining a molar ratio of total aluminum to total monoamminealuminum chloride of (0.5 to 1.2):1.

5. The process as claimed in claim 1, wherein only so much ammonia is added per unit of time that the ammonia concentration in the evolving hydrogen is less than 0.3% and the excess of ammonia in the melt after all of the aluminum has reacted is not more than 0.5 mol of ammonia per mol of monoamminealuminum chloride.

6. The process as claimed in claim 5, wherein the excess ammonia from the melt after all of the aluminum has reacted is less than 0.2 mol of ammonia per mol of monoamminealuminum chloride.

7. The process as claimed in claim 1, wherein so much ammonia is introduced into the monoamminealuminum chloride melt after all of the aluminum has reacted that 1 to 3 mol of ammonia are taken up per mol of the monoamminealuminum chloride used, before the temperature is raised above 400° C.

8. The process as claimed in claim 7, wherein so much ammonia is introduced into the monoamminealuminum chloride melt that 1.5 to 2.5 mol of ammonia are taken up per mol of the monoamminealuminum chloride used.

9. The process as claimed in claim 1, wherein the aluminum is used in the form of rods, blocks or shot.

10. The process as claimed in claim 1, wherein ammonia is introduced into the aluminum-containing monoamminealuminum chloride melt at temperatures between 280° and 360° C., ammonium nitride being precipitated.

11. The process as claimed in claim 1, wherein 12 to 15 g of ammonia are introduced per hour per mol of monoamminealuminum chloride into the aluminum-containing monoamminealuminum chloride melt.

12. The process as claimed in claim 1, wherein the temperature is raised to 420°-600° C. after all of the aluminum has reacted.

13. The process as claimed in claim 1, wherein the precipitated aluminum nitride is separated from the monoamminealuminum chloride melt by filtration.

14. The process as claimed in claim 13, wherein the separated aluminum nitride is annealed at temperatures between 400° to 1500° C.

15. The process as claimed in claim 14, wherein the annealing is carried out in an inert gas or ammonia atmosphere or mixtures thereof.

16. The process as claimed in claim 1, wherein the molten monoamminealuminum chloride is distilled off from the precipitated aluminum nitride.

17. The process as claimed in claim 16, wherein the removal by distillation of the monoamminealuminum chloride is carried out in vacuo or in an inert gas atmosphere with the formation of aluminum nitride agglomerates having $d_{50} > 10$ μm.

18. The process as claimed in claim 16, wherein the removal by distillation of the monoamminealuminum chloride is carried out in an ammonia atmosphere with the formation of aluminum nitride agglomerates having $d_{50} < 10$ μm.

19. The process as claimed in claim 18, wherein aluminum nitride agglomerates form having $d_{50} < 5$ μm.

20. The process as claimed in claim 16, wherein the separated aluminum nitride is annealed at temperatures between 400° and 1500° C.

21. The process as claimed in claim 20, wherein the annealing is carried out in an inert gas or ammonia atmosphere or mixtures thereof.

* * * * *